May 1, 1951 V. SUSSIN 2,551,181
CAMERA
Filed Aug. 29, 1947 2 Sheets-Sheet 1

Inventor
Victor Sussin
By Watson, Cole, Grindle & Watson
Attorneys

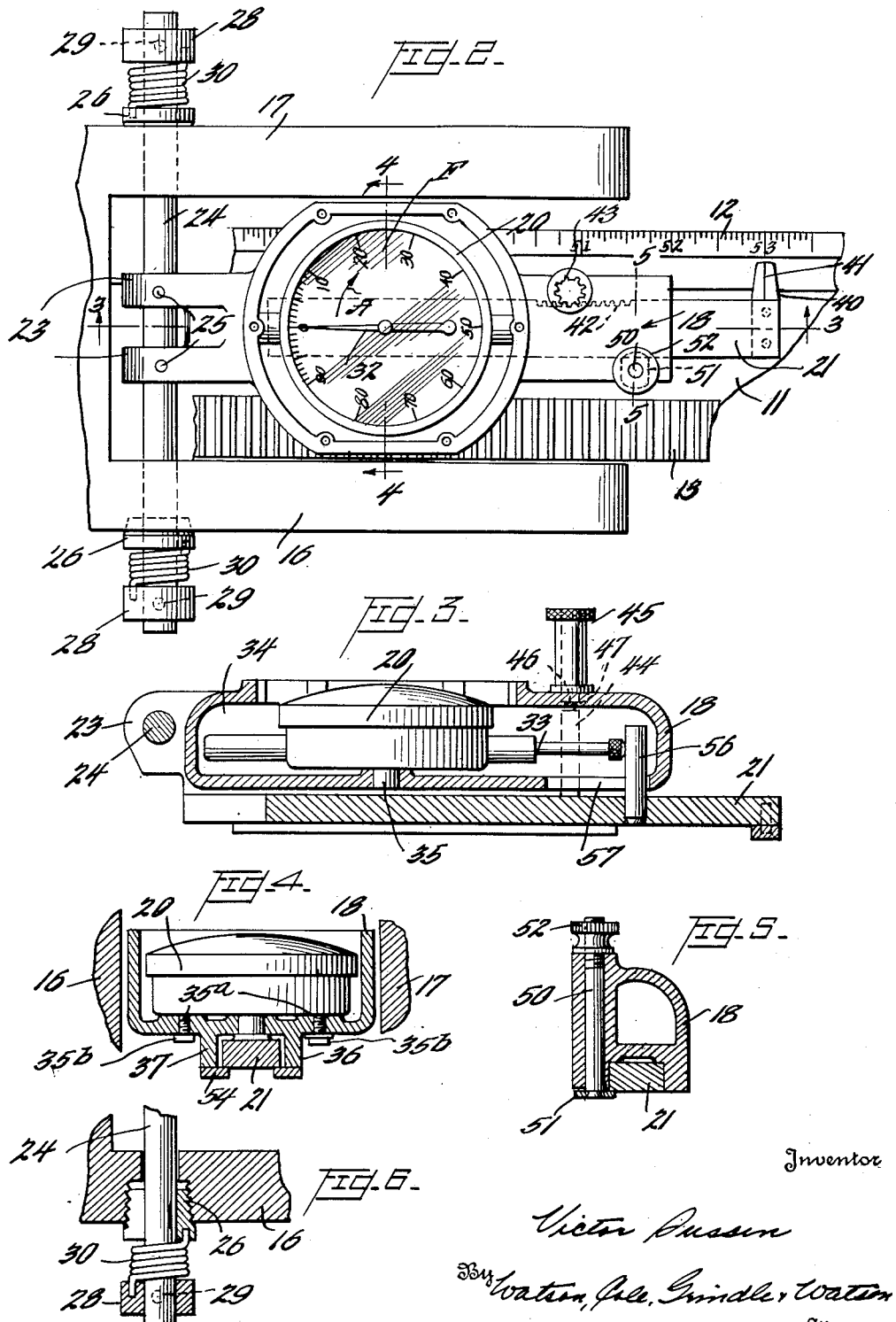

Patented May 1, 1951

2,551,181

UNITED STATES PATENT OFFICE 2,551,181

CAMERA

Victor Sussin, Chicago, Ill., assignor to American Type Founders, Incorporated, Elizabeth, N. J., a corporation of New Jersey Application August 29, 1947, Serial No. 771,307

7 Claims. (Cl. 88—24)

It is frequently found necessary or desirable, in the practice of commercial photography, to take a picture of some object or piece of work which picture is to be an exact duplicate of one previously taken, the camera having in the intervening period been re-adjusted once or many times for the purpose of taking pictures of other objects. The ability to precisely reproduce at widely spaced intervals of time identical exposures of a subject is particularly important to those engaged in the production of printing plates. The camera used is generally of large size, the lens board and copy board being mounted, respectively, upon an elongated rigid frame. In order that a second exposure of a subject shall be identical with an original exposure it is, of course, necessary for the operator to position the film, lens board and copy board in the same relative positions for the purpose of the re-take as these several members occupied during the original exposure. The present invention relates particularly to means for facilitating the precise repositioning of the lens and copy boards of the commercial camera when it is desired by the photographer to exactly reproduce the conditions under which a previous exposure was made.

It is customary to provide commercial cameras with longitudinally extending scales and to provide in association with the copy and lens board, respectively, pointers to play over such scales, thereby providing the photographer with means to definitely ascertain the positions of the lens and copy boards upon the frame of the camera, for any particular exposure, when he so desires. The pointer associated with the lens board will indicate the precise position of the lens board upon the camera frame when any certain exposure is taken, and the pointer associated with the copy board will do likewise for that board. These positions may be noted in a journal or record book and the lens and copy boards adjusted again to these relative positions when a re-take of the same object is in order. For precise duplication in photography it is essential that the relative repositioning of the film, lens board and copy board be most accurately repositioned and, with devices of the type heretofore employed in the art, embodying various arrangements of pointers and scales, it has seldom been possible to effect such repositioning with the high degree of accuracy desired.

The object of the present invention is to provide an improved means, to be associated with a lens or copy board, for facilitating the precise repositioning of such board. Such improved means permits the photographer to reposition the lens or copy board more accurately than has heretofore been possible, in less time than heretofore required for effecting such repositioning operation, and is more durable and long lasting in operation. It will be appreciated that the commercial camera, which is a large and relatively costly structure, has a useful life of many years and the mechanism for facilitating the repositioning of these boards should have a useful life equally as long. Devices of this nature heretofore employed have frequently failed or become inaccurate prematurely.

The novel repositioning means includes a pointer associated with the copy or lens board with which it is to be used, which pointer plays over a stationary scale affixed to the frame, the pointer slidably resting upon the scale, however, so that there can be one and only one reading for a given positioning of the pointer, the distance between the pointer and scale never varying and there being no possibility that inaccuracy in reading may result because the observer studies the pointer and scale from different angles or viewpoints, in noting the original position and in resetting for a re-take. To permit the pointer to slidably rest upon the scale it is pivoted upon the base of the copy or lens board with which it is associated. To prevent any variation in the distance between the pointer and the lens or copy board which might result from wear in the means for pivotally mounting the pointer upon the copy board the pivotal mounting means includes a novel wear takeup device which automatically compensates for any wear which may occur and maintains the pivotal axis about which the pointer swings in precise predetermined relationship with the associated copy or lens board.

The mechanism is such that the position of the copy or lens board to which it is attached may be determined by means of a dial indicator of known type, the pointer being moved manually to a line of graduation on the scale and the precise position of the associated board being indicated by the dial indicator. The dial indicator is an easily read and very accurate device, widely used in commerce, and its use in combination with the adjustable pointer is particularly helpful in a mechanism of the character described. The indicator is so mounted upon its support that its indicating hand may move in one direction only, from a zero position, and the arrangement is preferably such that the indicating hand moves when the pointer which plays over the fixed scale is drawn toward the lens board or copy board by suitable manually operable adjusting means.

The camera with which the improved copy or lens board repositioning device is employed may vary widely in design and details of construction. It is only essential that the camera include means for supporting the lens and copy boards for movement longitudinally of a stationary scale.

In the drawings:

Figure 2 is a top plan view of the repositioning means;

Figure 3 is a section on line 3—3 of Figure 2;

Figure 4 is a section on line 4—4 of Figure 2;

Figure 5 is a section on line 5—5 of Figure 2; and

Figure 6 is a section through a portion of the pivotal support showing the pointer supporting means.

Figure 1:
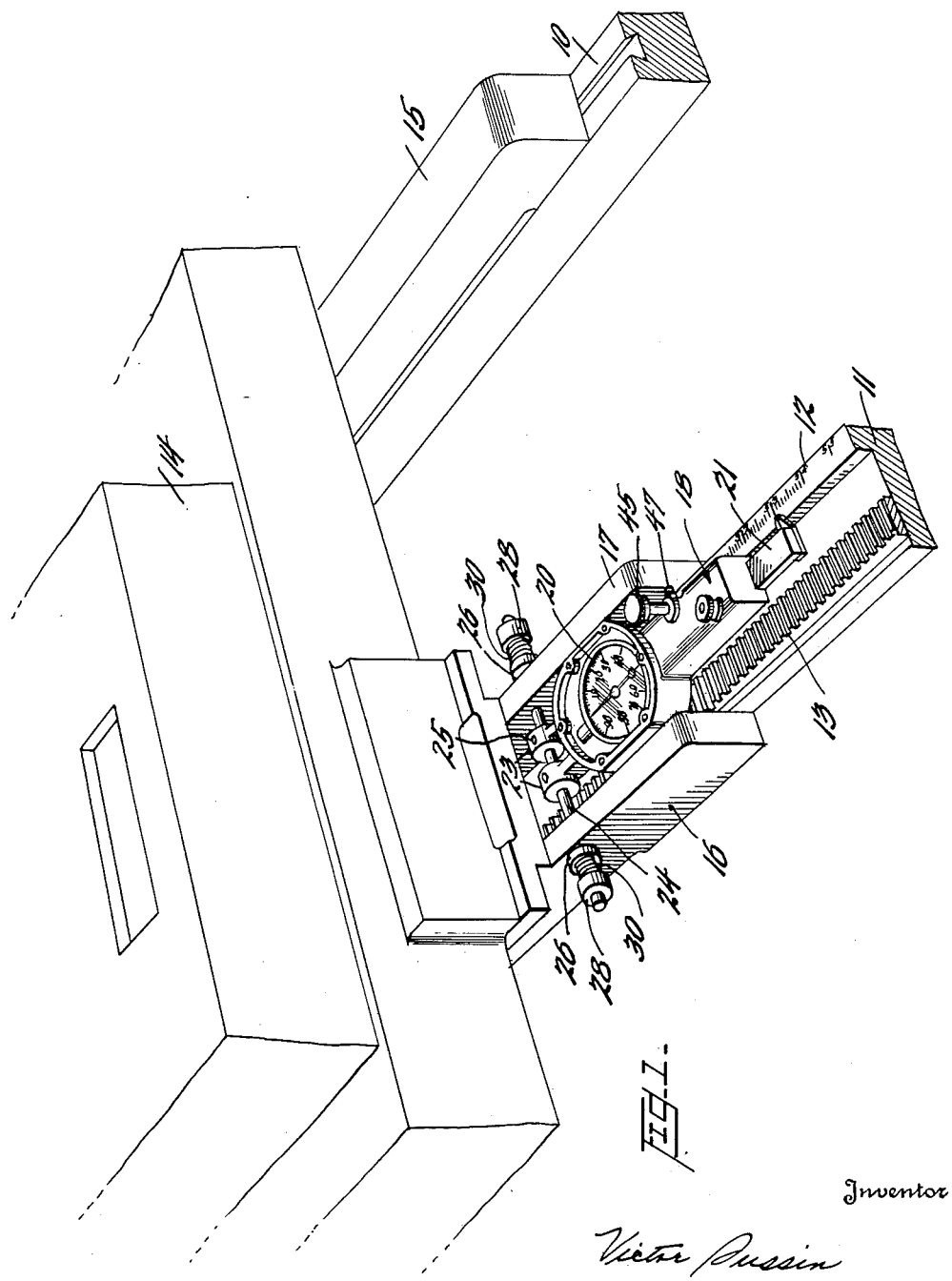
Figure 1 is a perspective view of a portion of a camera, certain elements of the frame being shown and likewise portion of a copy or lens board to which is attached the novel repositioning device.

In the accompanying drawings, more particularly in Figure 1, fragments only of a camera frame are illustrated, one of the two side rails of the frame being indicated at 10 and a parallel center rail at 11. Upon the center rail 11 is mounted the fixed or stationary scale 12 and likewise a rack 13 which may be engaged by a pinion associated with the lens or copy board and which pinion may be manually or power operated to effect movement of the board longitudinally of the frame. A portion of the base of a lens or copy board is indicated at 14 and two members 15 (of which one only is shown), attached to or integral with the copy board 14, comprise board supporting feet which engage the upper surfaces of the side rails, members 15 being slidable upon the side rails 10 in conventional manner. The details of construction of the copy or lens board are not shown and likewise details of construction of all other parts of the camera are omitted, it being understood that the camera is preferably of conventional type including, in addition to the film support, lens board and copy board, other features necessary to enable it to be used in the customary manner in the taking of pictures.

Attached to or formed integral with the frame of board 14, which as explained may be the frame of a lens board or a copy board, are two parallel vertically disposed flat members 16 and 17, generally rectangular in shape as viewed from the side, the mutually facing inner surfaces of these members making sliding contact with the oppositely facing vertical side surfaces of the rail 11, the rail thus comprising a guide for preventing lateral movements of the board as it is advanced or retracted. Positioned intermediate members 16 and 17 is a housing generally indicated at 18, this housing comprising a means for directly supporting a dial indicator 20 and likewise a pointer slide 21.

Housing 18 is provided with spaced bearing members 23 provided with aligned apertures to receive the horizontally disposed pivot pin 24, set screws 25 preventing relative rotation of members 23 and pin 24. Details of the pivotal support for the housing 18 may be most clearly perceived in Figures 2 and 6. Pin 24 passes through aligned apertures in members 16 and 17 and likewise through split bearings 26 which taper externally and are received within tapered recesses formed in members 16 and 17, respectively, the outer conical surface of each bearing being threaded and the interior conical surfaces of the recess intended to receive it being likewise threaded. Fixed upon the ends of the pin 24 are annular collars 28, set screws 29 being provided to prevent relative rotation of these collars and the pin.

Intermediate collar 28 and the conical split bearing 26, and encircling pin 24, is a coiled torsion spring 30, one end of which is received with a close fit in a recess formed in the inner side of the associated collar 28 and the other end of which is received within a recess formed in the outer end of the split bearing 26. The spring 30 is kept under tension by rotating the collar 28 and securing it in a desired position of adjustment, the action of the spring being in such direction that it exerts a force upon the split bearing 26 which tends to cause that bearing to enter more deeply into the recess provided for its reception. It is clear that, should there be any wear of the pin 24 or bearing 26 which would, unless taken up, result in looseness of the pin 24 within its bearing, the bearing will automatically contract so that its inner surface will closely engage the pin, the bearing being rotated and its diameter contracted automatically as wear occurs. Hence, the axis of the pin is maintained in a constant position and the housing and its associated parts are thus maintained in fixed relation to the board 14, even though long use of the mechanism may cause wear of the pin or pin bearings, or both.

Dial indicator 20 is of conventional type, well known to machinists, having a face F provided with an annular graduated scale and having an indicating hand 32 which is caused to move from its zero position, in which position it is shown in Figures 1 and 2, in the direction of the arrow A (Figure 2) when pressure is applied on the end of its operating stem 33. The indicator is housed within a chamber 34 of the housing as clearly shown in Figure 3, a short post 35 rigid with the casing of the indicator extending into, with a close fit, an aperture formed in the housing wall, and threaded bolts 35a, rigid with the indicator backwall extending through other apertures formed in the bottom wall of chamber 34, securing nuts 35b being applied to the bolt ends. If desired a protective cover of transparent material such as glass (not illustrated) may be secured to the housing.

Housing 18 likewise has formed integral therewith two downwardly projecting parallel flanges 36 and 37 which together define a slideway for the pointer slide 21. The pointer slide has affixed to its outer end, as by means of rivets, the laterally projecting pointer member 40 having an indicating line 41 inscribed thereon and extending normally to the axis of the slide. The laterally projecting pointer portion 40 of the pointer slide member is adapted to rest at all times upon the scale 12 and the indicator line 41 may be brought into precise registration with any selected numeral on the fixed scale 12 by manually moving the pointer slide longitudinally. For the purpose of longitudinally adjusting the pointer slide it is provided with a series of rack teeth upon one edge, indicated at 42, and these teeth engage with teeth 43 formed upon the lower end of the vertically supported rotatable shaft 44 having a knurled operating member 45 affixed to its upper end. Shaft 44 is provided midway of its length with an annular recess 46 and projecting into this recess is a pin 47, the pin 47 locking the shaft against endwise movement but permitting free rotation. Pin 47 projects through the wall of the housing 18 and may be readily removed from the outside when desired, thus making possible the withdrawal of shaft 44.

To secure the pointer slide 21 in any position to which it may be adjusted a clamping means is provided, this means being shown most clearly in Figure 5. It includes a vertical rod 50 to the lower end of which is rotatably secured a clamping plate or member 51. The upper end of rod 50 is threaded and a nut 52 having a knurled exterior has threaded engagement therewith, the annular lower face of nut 52 resting upon an annular seating surface formed on the housing 18. Clamping member 51 is held against rotation by contact with one end of the retaining flange 54 secured to the undersurface of flange 37 of the housing so that, when rod 50 is lifted by rotation of nut 52 the pointer slide is gripped by member 51 and pressed tightly against the upper wall of the slideway defined by members 36, 37 and the undersurface of the floor of the housing above. The pointer slide may thus be frictionally held in any position to which it is adjusted.

Movement of the pointer slide 21 is communicated to the stem 33 of the dial indicator by means of an abutment or post 56 the lower end of which is secured within a recess in the pointer slide member 21 being thus rigidly mounted on and movable with the slide. It projects through a slot 57 formed in the undersurface of the housing 18.

The manner in which the resetting device is used has been previously explained in broad terms. Assuming that the copy and lens boards of the camera have been precisely adjusted for the purpose of taking an exposure the operator will wish to note the exact position of each so that these boards may be repositioned if a retake is to be made. The pointer indicator line 41 will probably lie between two major graduations on the scale and, to determine the board's exact position, the pointer slide is retracted until indicator line 41 is coincident with the next major scale graduation. Assuming that pointer 32 has registered zero at the beginning of this retraction, and post 56 was initially just in contact with the end of stem 33, the pointer 32 will be caused to indicate, on the dial over which it moves, the distance which the pointer slide moves. The true position of the board is thus obtained when the dial reading is added to the number of the major scale graduation with which indicator line 41 registers.

It will be appreciated by those skilled in the art that the design and arrangement of the component elements of the invention may be modified in adapting the same to camera structures which differ in constructional details.

Having thus described the invention, what is claimed as new and desired to be secured by Letters Patent is:

1. In a camera, in combination, a frame, a scale mounted on the frame, a board mounted on the frame for movement longitudinally of the scale, a housing, means connecting the housing to the board, a dial indicator mounted on said housing, a pointer slide movably supported on said housing, the pointer of said slide being operatively associated with said scale, and means connecting the pointer slide and dial indicator whereby movements of the pointer slide are registered on the indicator.

2. In a camera, in combination, a frame, a scale mounted on the frame, a board mounted on the frame for movement longitudinally of the scale, a housing, means connecting the housing to the board, a dial indicator mounted on said housing, a pointer slide movably supported on said housing, the pointer of said slide being operatively associated with said scale, means connecting the pointer slide and dial indicator, and manually operable devices for moving the pointer slide and clamping the same in any desired position of adjustment.

3. The combination set forth in claim 2 in which said housing is provided with a slideway for said pointer slide and the clamping device is adapted to engage said pointer slide and force the same against the wall of the slideway.

4. In a camera, in combination, a frame, a scale mounted on the frame, a board mounted on the frame for movement longitudinally of the scale, a dial indicator having an elongated operating stem, means supporting the dial indicator with the operating stem thereof disposed in substantial parallelism to the scale, a pointer slide slidably mounted on said means for movement along a path parallel to said indicator stem, and a member rigid with the pointer slide and in contact with the dial operator stem.

5. The combination set forth in claim 4 in which said means is mounted on said board, for pivotal movement about a fixed axis, and the pointer slide slidably engages and rests upon the scale.

6. In a camera of the type including copy and lens boards, in combination, an elongated frame upon which lens and copy boards may be mounted for independent movement along a fixed axis, a horizontally disposed elongated scale mounted on and extending longitudinally of said frame, said scale having a smooth pointer supporting surface coextensive in length with the graduated portion thereof, a board for supporting a lens or copy material, said board being mounted on the frame for movement longitudinally thereof along said fixed axis, a pointer disposed longitudinally of the frame and scale, one end of said pointer being mounted on the board for pivotal movement about a horizontal axis disposed transversely of the scale, and the other end thereof having a portion slidably resting upon the pointer supporting surface of the scale so as to be slidable from graduation to graduation of the scale without losing contact with said supporting surface, whereby, for a given position of the board and pointer, only one scale reading is possible.

7. In a camera, in combination, an elongated frame, a scale mounted on the frame and extending longitudinally thereof, a board mounted on the frame for movement longitudinally of the frame, a pointer, and means mounting the pointer on the board, said means including a horizontally disposed shaft, split bearings encircling the shaft and supporting the same for rotation, and a device associated with each bearing for normally causing the same to closely engage the shaft and compensate for wear.

VICTOR SUSSIN.

REFERENCES CITED

The following references are of record in the file of this patent:

UNITED STATES PATENTS

| Number | Name | Date |
| --- | --- | --- |
| 971,367 | Fruwirth | Sept. 27, 1910 |
| 1,182,487 | Huebner | May 9, 1916 |
| 1,401,902 | Fruwirth | Dec. 27, 1921 |
| 1,510,942 | Kinzler | Oct. 7, 1924 |
| 1,551,698 | Robertson | Sept. 1, 1925 |
| 1,885,982 | Bornmann | Nov. 1, 1932 |

FOREIGN PATENTS

| Number | Country | Date |
| --- | --- | --- |
| 364,946 | Germany | Dec. 5, 1922 |